(12) United States Patent
Cerruti et al.

(10) Patent No.: US 9,381,827 B2
(45) Date of Patent: Jul. 5, 2016

(54) ADJUSTABLE SEAT FOR A MOTOR VEHICLE

(71) Applicant: SABELT, S.p.A., Turin (IT)

(72) Inventors: Giorgio Cerruti, Turin (IT); Antonio Bello, Turin (IT); Raffaello Cornolti, Turin (IT)

(73) Assignee: SABELT S.P.A., Turin (IT)

( * ) Notice: Subject to any disclaimer, the term of this patent is extended or adjusted under 35 U.S.C. 154(b) by 32 days.

(21) Appl. No.: 14/360,482

(22) PCT Filed: Nov. 22, 2012

(86) PCT No.: PCT/IB2012/056609
§ 371 (c)(1),
(2) Date: May 23, 2014

(87) PCT Pub. No.: WO2013/076670
PCT Pub. Date: May 30, 2013

(65) Prior Publication Data
US 2014/0339873 A1    Nov. 20, 2014

(30) Foreign Application Priority Data

Nov. 25, 2011 (IT) .............................. MI2011A2152

(51) Int. Cl.
| | |
|---|---|
| *B60N 2/16* | (2006.01) |
| *B60N 2/68* | (2006.01) |
| *B60N 2/07* | (2006.01) |
| *B60N 2/22* | (2006.01) |
| *B60N 2/44* | (2006.01) |
| *B60N 2/06* | (2006.01) |

(52) U.S. Cl.
CPC *B60N 2/161* (2013.01); *B60N 2/06* (2013.01); *B60N 2/0705* (2013.01); *B60N 2/1615* (2013.01); *B60N 2/22* (2013.01); *B60N 2/449* (2013.01); *B60N 2/686* (2013.01)

(58) Field of Classification Search
CPC ........ B60N 2/161; B60N 2/1615; B60N 2/06; B60N 2/686; B60N 2/0705; B60N 2/22; B60N 2/449
USPC ....................................... 297/344.13, 344.15
See application file for complete search history.

(56) References Cited

U.S. PATENT DOCUMENTS

| | | | | |
|---|---|---|---|---|
| 7,066,540 B2 * | 6/2006 | Minai et al. | ............. | 297/344.15 |
| 8,353,558 B2 * | 1/2013 | Okamoto et al. | .......... | 297/216.1 |
| 8,596,721 B2 * | 12/2013 | Ozawa | ..................... | 297/344.15 |
| 8,616,636 B2 * | 12/2013 | Arata | ....................... | 297/216.16 |
| 2010/0001569 A1 * | 1/2010 | Shinozaki | ................ | 297/344.15 |

FOREIGN PATENT DOCUMENTS

| | | |
|---|---|---|
| DE | 19726680 A1 | 1/1999 |
| DE | 102004002313 B3 | 4/2005 |
| DE | 202004020657 U1 | 9/2005 |

* cited by examiner

*Primary Examiner* — Milton Nelson, Jr.
(74) *Attorney, Agent, or Firm* — Thomas Horstemeyer, LLP

(57) ABSTRACT

A seat for a vehicle having a seating. The vehicle having a floor. The seating having a first flank and a second flank, on the opposite sides with respect to the seating. The seating further having a lower face facing at least one portion of the vehicle floor. The seat comprising a support for the seating suitable to allow at least the height adjustment of the seating relative to the vehicle floor, comprising a first piston rod and a second piston rod arranged at the front part and externally facing on opposite sides the flanks of the seating, and comprising a third piston rod and a fourth piston rod arranged at the back and facing on opposite sides the flanks of the seating or elongations thereof.

14 Claims, 7 Drawing Sheets

ADJUSTABLE SEAT FOR A MOTOR VEHICLE

CROSS-REFERENCE TO RELATED APPLICATION

This application is the 35 U.S.C. §371 national stage of PCT Application No. PCT/IB2012/056609, filed Nov. 22, 2012, which is herein incorporated by reference in its entirety and which also claims priority to, and the benefit of, Ialian Patent Application No. MI2011A002152, filed Nov. 25, 2011, which is herein incorporated by reference in its entirety.

The present invention relates to a seat comprising a seat lift that allows adjusting the position of the seat, and particularly of the seating, relative for example to the guide devices of a vehicle.

Many and different motor vehicle seatings are known, which are provided with devices for the adjustment of the seat configuration, particularly for the adjustment of the seating position relative to the vehicle floor, beside varying the backrest position.

In fact, it is very important in a motor vehicle to allow a driver positioning him/herself at the driver's seat in an optimal manner, in order to allow an optimal visibility of the external environment, and an optimal reachability of all the control and driving means of the vehicle. Particularly, the motor vehicles are designed based on the position that some peculiar points of the human body have to take when it is seated on the seat, among which, for example the height L of a central point of the driver's pelvis relative to a reference level, which is, for example, defined by the vehicle floor of the motor vehicle or by the wheel axles, or the road level. Beside the height L, it is important to take into account also the other two coordinates of the same point H in the longitudinal and transversal directions, which are assessed based on the forward direction of the motor vehicle.

In order to allow the same optimal conditions of use to drivers having different heights, seat adjustment devices are known, which are suitable to bring the point H to a desired position.

However, in specific applications, for example, in the field of sports motor vehicles, the need is felt to allow the driver a posture that is substantially flat and with his/her pelvis in a low position. This need is motivated, on one hand, by aerodynamic requirements of the vehicle external shape, which has to be lower than a non-sports vehicle, and, on the other hand, by stability requirements when bending, which involves the need that the vehicle barycenter is low, that is, as much close to the road level as possible.

Attempts to obtain a seat that allows the driver a posture with a low point H are known in the field, but such attempts in some cases consisted in a mere reduction of the thickness of the soft padding material that forms a seat cushion, or, in other cases, even in the complete elimination thereof, by replacing it with a nude rigid shell, which is not coated with a soft material, and not adjustable in the vertical direction. Both these solutions involve the drawback to force, in some cases, to customize the seat and to provide the driver with a very reduced comfort degree, in contrast to the needs of a field of users that requires instead high levels of comfort and safety of use, to allow also long travels or a sports driving.

As it is known, for example, from the document U.S. 2010/0283282 by Porsche AG, a seating structure of a vehicle seat comprises two supports extending in a longitudinal direction of the vehicle, and so shaped as to be connected to a vehicle floor or to tracks for the adjustment of the seating structure. The structure further comprises a seating shell mounted between, and connected to, the supports, and so shaped as to house a cushion. The seating shell is connected to the respective support so that a closed profile in a connection area is created therebetween. The shell is made of a light metal, and the supports can be of mesh. The supports are connected to the adjusting tracks by means of rotatable connection arms. Each side of the seating structure is connected at the rear and front parts in an articulated manner to an upper track by means of connection arms that are suitable to adjust the tilt of the cushion. Opposite ends of the respective connection arms are hinged to a respective support and to the respective upper track.

This known solution has the main drawback to not allow lowering the seat up to the point of substantially eliminating the distance between the lowermost part of the seat and the vehicle floor, since the downward movement of the seat, even if it is possible up to a preset minimum value of the distance between the seat and the vehicle floor, is at some point prevented by the dimensions of the tracks against which the supports of the seating structure abut. On the other hand, the above-mentioned document does not aim to solve the problem of lowering the seat so as to allow the driver a posture having a low point H, consequently bringing the lower part of the seating to a minimum distance from the vehicle floor, but only to adjust the seat tilt.

From the document EP2123501 by the firm Autoliv Development AB, an adjustment device is known for adjusting the position of a vehicle seating, comprising a fixed member that is located relative to the vehicle floor, a mobile member for the connection to the seat lower side, which is connected to the fixed member so that the distance of the mobile member from the fixed member can vary, a threaded shaft that is secured to one of the mobile member and the fixed member, extending therefrom, a nut that is screwed on the threaded shaft, a connection arm having a substantially preset length, having an end connected to the nut and the other end connected to the other end of the fixed member and of the mobile member. The device is such that the relative movement between the nut and the shaft causes the movement of the nut towards or away from one of the mobile member and the fixed member, involving that the mobile member is driven away from or toward the fixed member, by adjusting the seating height above the vehicle floor.

This solution also has the drawbacks listed above. Furthermore, it has the further drawback that the adjusting device rests below the seating, therefore it is interposed between the vehicle floor and the seating. This prevent the seating from being brought to a minimum distance from the vehicle floor, due to the height dimensions of the device itself, which is interposed therebetween. It is not possible to eliminate the relative distance between the seating lower part and the vehicle floor. Therefore, such a solution does not allow the driver to reach a flat posture and with a central point H of his/her pelvis in a low position, thus making such a seat not suitable for a safe and comfortable use during a sports driving.

From the document DE 10 2004 002313 B3 by FAURECIA AUTOSITZE GMBH & CO, it is known to produce a supporting structure for a seat, not a seat, that allows height adjusting a seating, a body shell that, however, it is never illustrated in the Figures of this document, relative to a vehicle floor, also not shown. This known solution has pairs of front piston rods and pairs of rear piston rods for each flank of the supporting structure. These pairs of piston rods are constrained to a base crosspiece inferiorly and to a body shell crosspiece superiorly.

It shall be apparent that this structure has limitations in the adjustment of the lowermost position, i.e., of the position bringing the body shell of the seat near to the vehicle floor. In fact, the pair of piston rods interferes, and it does not allow a free rotation thereof, and it does not allow bringing the seat body shell near to the vehicle floor.

Other solutions that have the same drawbacks are known from DE 20 2004 020657 U1 by FAURECIA AUTOSITZE GMBH & CO and by DE 197 26 680 A1 (FAURE BERTRAND SITZTECH GMBH.

Therefore, the Applicant felt the need to propose a seat for a motor vehicle that allows positioning the seating at a height that is very low relative to the road level, therefore relative to the floor of the motor vehicle, while having a high comfort and safety of use.

Therefore, the object of the present invention is to provide a seat for a motor vehicle that has a seating positionable at a minimum distance from the vehicle floor, while being height adjustable.

Another object of the present invention is to provide a seat for motor vehicle with a structure that is also constructively simple and having a light weight.

These and further objects and advantages are achieved by a vehicle seat as described in the claim 1 that is annexed herein below.

According to a general embodiment of the present invention, a vehicle seat is provided, having a seating, suitable to allow a driver having two opposite flanks sitting on said seating in the forward direction of the vehicle, said vehicle having a vehicle floor, said seating having a first and a second flanks, on opposite sides with respect to the seating, extending substantially parallel to said driver's flanks, said seating having a lower face facing at least one portion of said vehicle floor.

Said seat comprises a support for said seating suitable to allow the height adjustment of said seating relative to the vehicle floor, comprising a first piston rod and a second piston rod arranged at the front part and externally facing on opposite sides said flanks of said seating, and comprising a third piston rod and a fourth piston rod arranged at the back and externally facing on opposite sides said flanks of said seating, each of said piston rods having a respective upper hinge connected to said flanks of said seating, and a respective lower hinge suitable to be constrained to the vehicle floor, each of said hinges having a respective rotation center, said rotation centers of said lower hinges defining a base plane passing through said centers, said first piston rod and said third piston rod forming a first articulated quadrilateral externally facing said first flank of the seating, and said second and fourth piston rods forming a second articulated quadrilateral externally facing said second flank of said seating, wherein said first and second quadrilaterals have a lower side connectable to the vehicle floor and an upper side connected to the seating.

Advantageously, said upper hinges are arranged above said lower face of said seating.

Particularly, said lower face of said seating is at least partially below said base plane, at least in a position of said seating.

Furthermore, such provisions allow height adjusting the seating position in such a manner as to be able to bring it near to the vehicle floor and to bring the lower face of the seating to a minimum distance from the vehicle floor, so as to allow the driver positioning on the driver's seat according to a flat posture and with his/her pelvis very close to the vehicle floor, for example, until being able to bring the distance of the point H to a value that is lower or near to 15 cm from the vehicle floor, without renouncing to the comfort of use of a seat cushion, as required by the driving needs of a sports vehicle.

Further objects, solutions, and advantages are present in the embodiments described herein below and claimed in the dependent claims that are annexed herein.

BRIEF DESCRIPTION OF THE DRAWINGS

Several embodiments of the invention will be now described herein below, by means of implementation examples, that are set forth only by way of illustrative, non-limiting example, with reference to the annexed figures, in which.

DETAILED DESCTIPTION OF THE INVENTION

Figure 1:
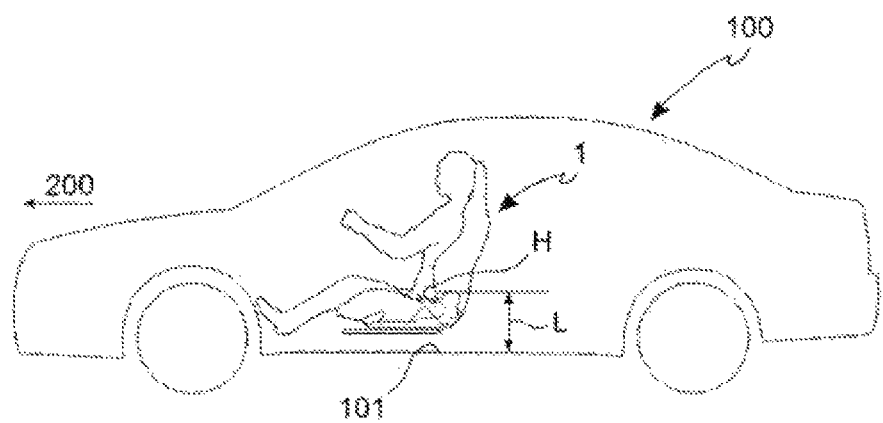
FIG. 1 shows in a longitudinal section a seat according to the invention, arranged within a motor vehicle.
Figure 2:
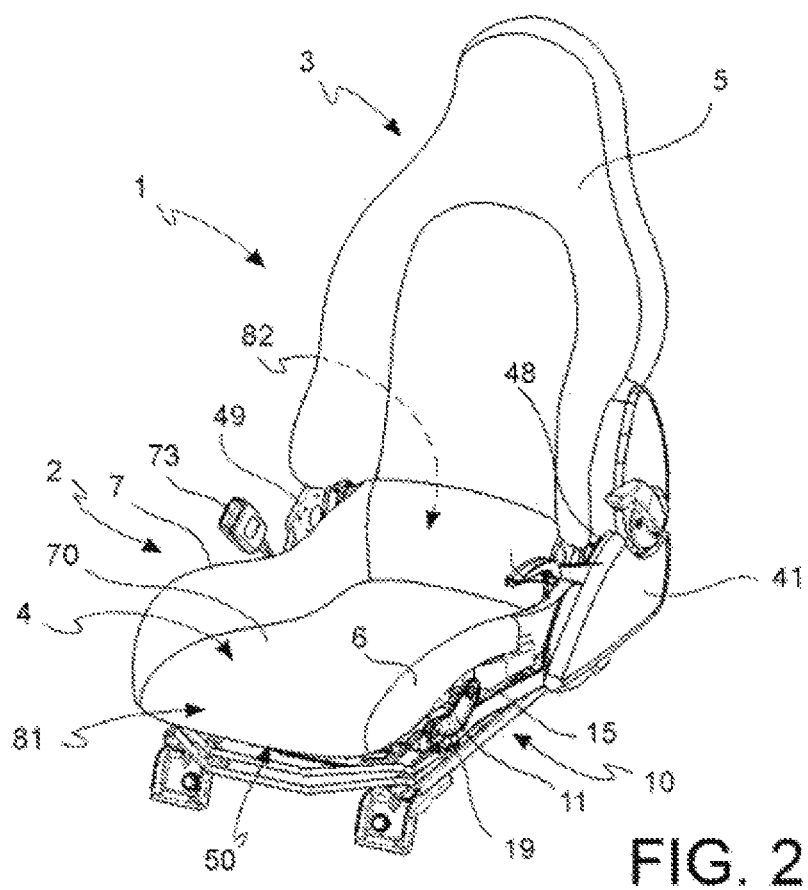
FIG. 2 shows in a perspective view an implementation example of such seat, having a seating and, for example, a backrest.
Figure 3:
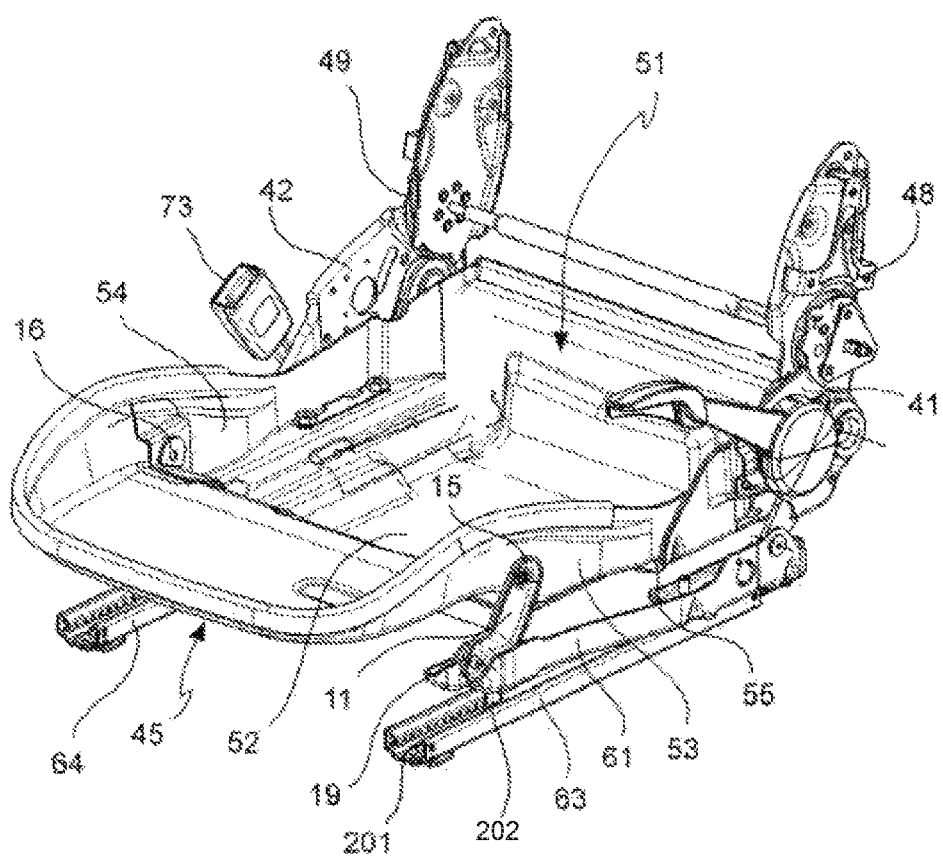
FIG. 3 shows in a perspective view a lower portion of the seating and an adjustable support that is suitable to adjust the seating position, wherein the support is in a position corresponding to a maximum distance between the seating and the vehicle floor.
Figure 4:
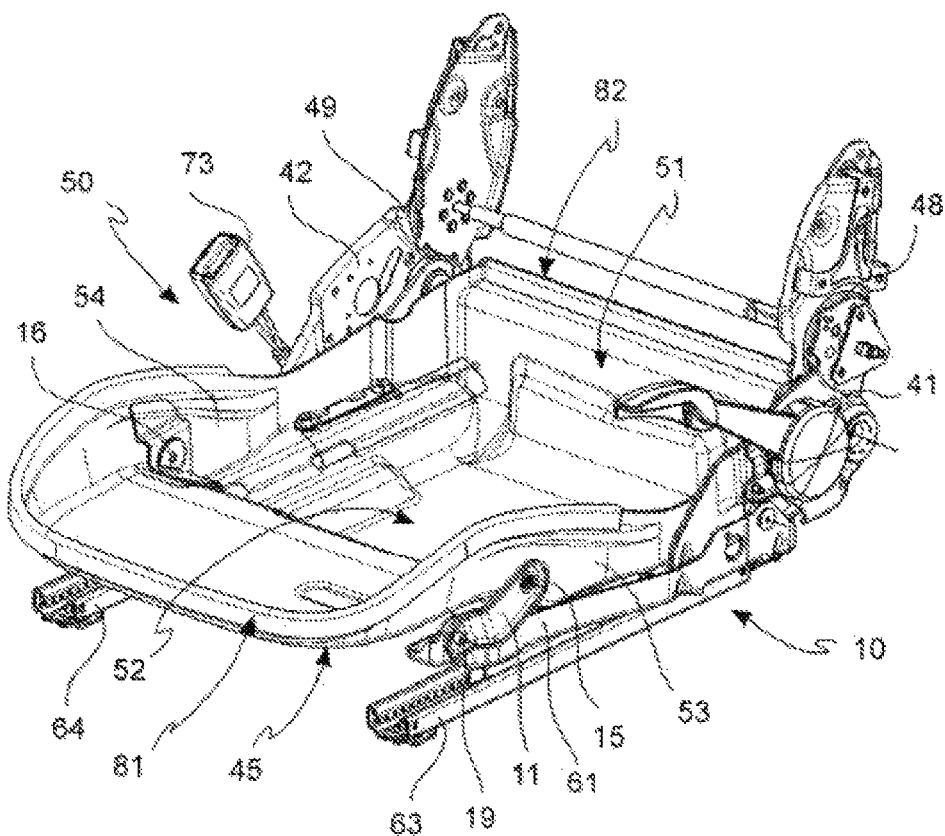
FIG. 4 shows in a perspective view the lower portion of the seating in a position corresponding to the minimum distance between the seating and the vehicle floor.
Figure 5:
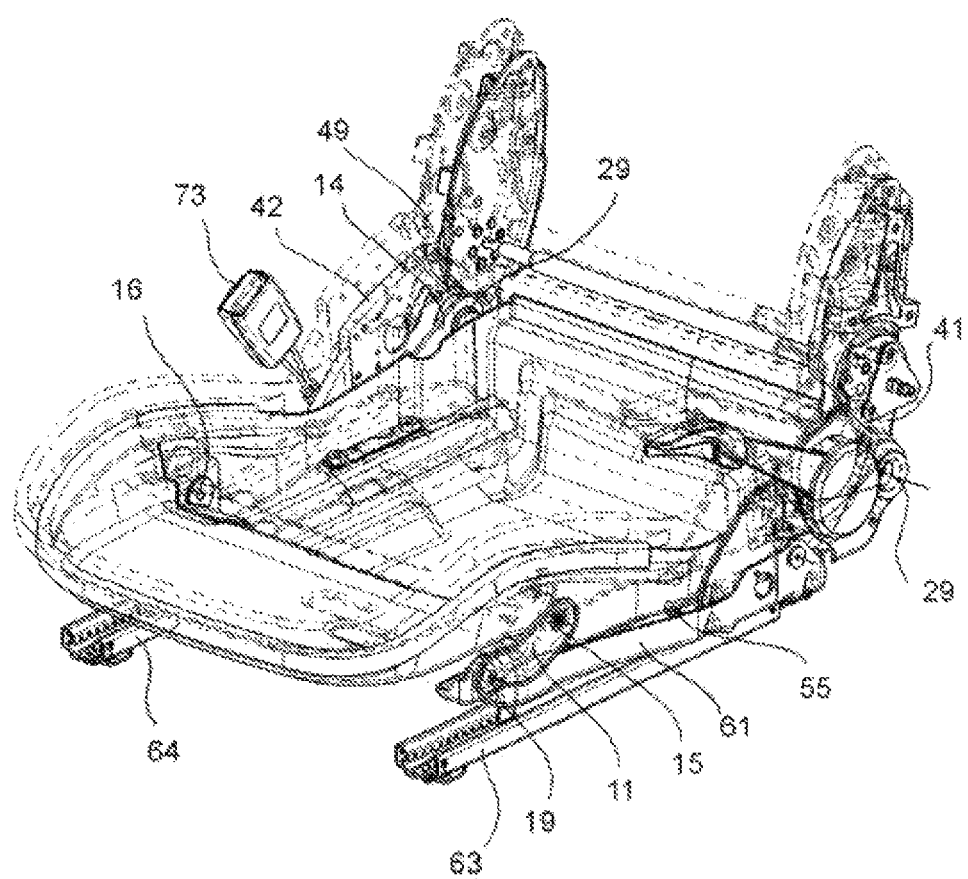
FIG. 5 shows in a perspective view the structure of the support for the seat and the shaped shell of the seating with a solid line in the position of minimum distance from the vehicle floor, while with a dotted line in the position of maximum distance from the vehicle floor.
Figure 6:
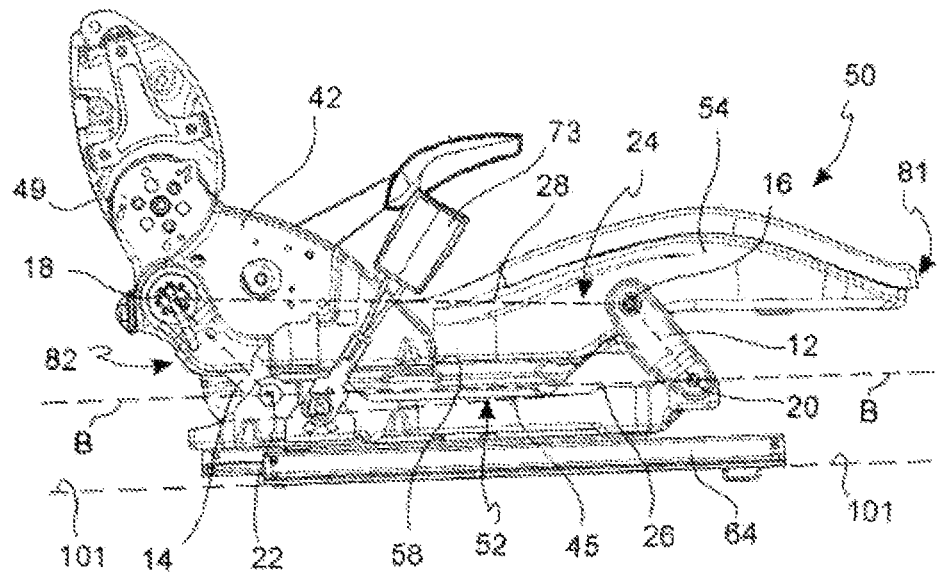
FIGS. 6 and 7 show in a side view from the right a structure of the seating and of the support in a position corresponding to a maximum distance from the vehicle floor and in a position corresponding to a minimum distance from the vehicle floor, respectively.
Figure 7:
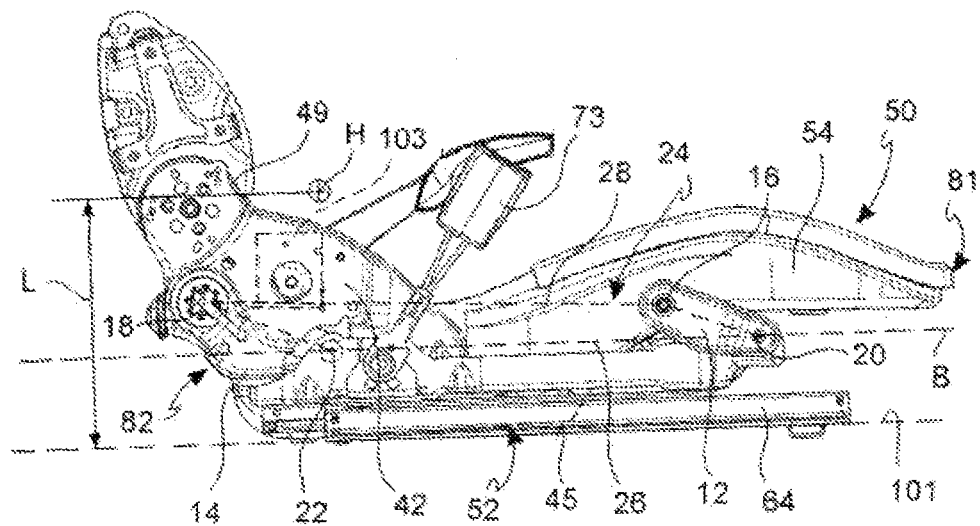
Figure 8:
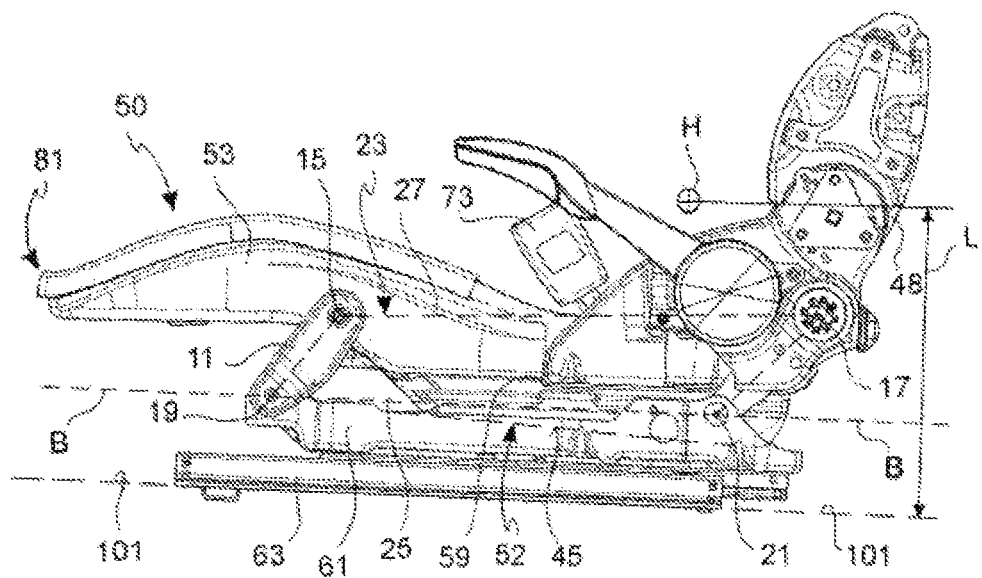
FIGS. 8 and 9 show in a side view from the left a structure of the seating and of the support in a position corresponding to a maximum distance from the vehicle floor and in a position corresponding to a minimum distance from the vehicle floor, respectively.
Figure 9:
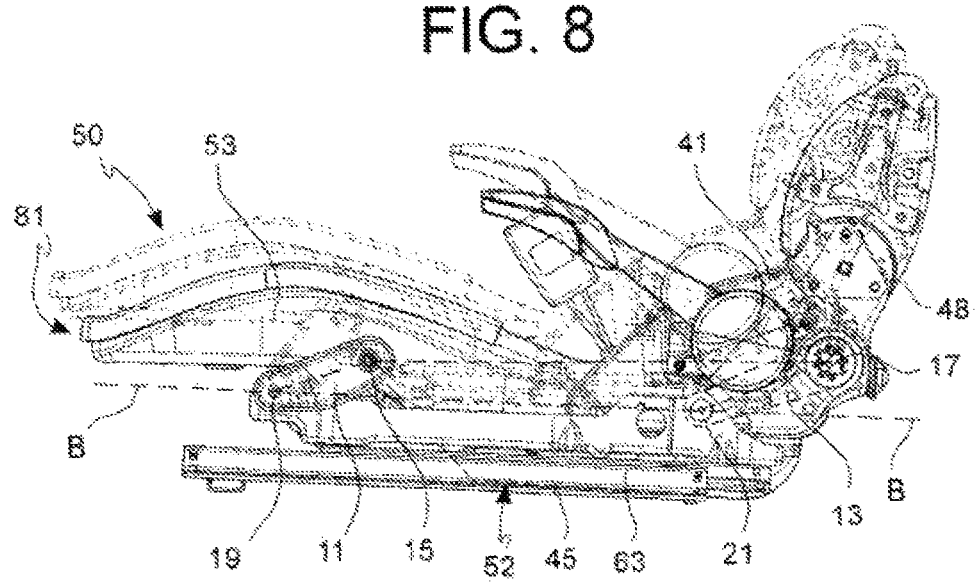
Figure 10:
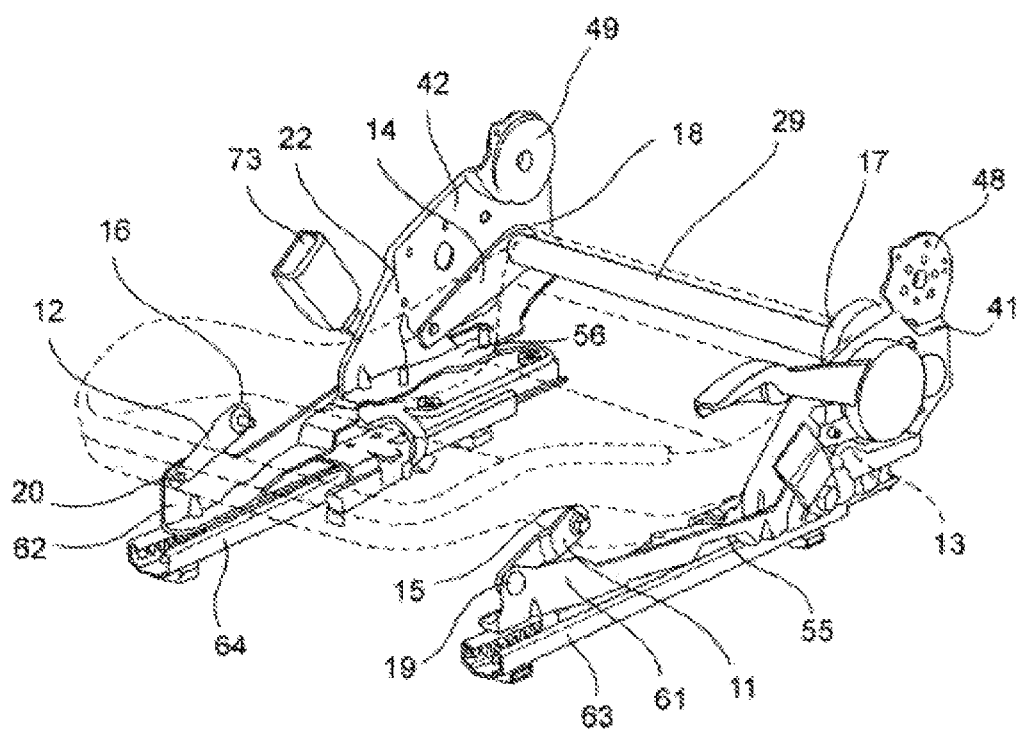
FIG. 10 shows in a perspective view a structure of the seat support according to a further embodiment.

Reference will be made herein below to a "vehicle floor" to mean the lower portion of the body shell of the motor vehicle comprising a generally substantially planar member facing the road level and suitable to define inferiorly the motor vehicle, and to support the seatings.

With reference to the Figures, a vehicle seat is generally indicated by the reference number 1, and comprises a seating 2 constrained to the vehicle floor by a support 10 that is suitable to allow the adjustment of the relative position between the seating 2 and the vehicle 100 floor 101, particularly to make so that the distance between a point H defined as an attachment point between the driver's thighbones and pelvis can take an optimal minimum value to ensure the proper posture of the driver when he/she drives the vehicle. The seating 2 has a front side 81 facing the forward direction of the vehicle, and an opposite rear side 82, facing the reverse direction of the vehicle.

In accordance with an embodiment, a preferred value of such minimum value of the distance between the point H and the vehicle floor is about 15 cm.

The seat 1 is arranged in the vehicle so that the driver can sit in the forward direction of the vehicle. The seating has flanks 6 and 7 on opposite sides of the seating 2 so as to be substantially parallel to the driver's flanks, and a lower face 45 facing at least one portion of the vehicle floor 101.

The support 10 for the seating comprises a first piston rod 11 and a second piston rod 12 that are arranged at the front part with respect to the seating, and facing externally on opposite sides the flanks 6 and 7 of the seating.

Furthermore, the support 10 for the seating also comprises a third piston rod 13 and a fourth piston rod 14 that are arranged at the back with respect to the seating 2 and facing externally on opposite sides the flanks 6 and 7 of the seating 2.

The above-mentioned four piston rods 11, 12, 13, 14 are rotatably constrained to the flanks 6 and 7 of the seating by upper hinges, and they are rotatably constrainable to the vehicle floor 101 by lower hinges.

In detail, the first front piston rod 11 has an upper hinge 15 and a lower hinge 19, the second front piston rod 12 has an upper hinge 16 and a lower hinge 20, the third rear piston rod 13 has an upper hinge 17 and a lower hinge 21, the fourth rear piston rod 14 has an upper hinge 18 and a lower hinge 22.

Each of said hinges has a respective rotation center, and the four rotation centers of the lower hinges 19, 20, 21, 22 define and belong to a base plane B passing through said centers.

Advantageously, the first piston rod 11 and the third piston rod 13 form a first articulated quadrilateral 23 externally facing, at least partially, the first flank 6 of the seating 2, wherein such a quadrilateral 23 has a lower side 25 that is connectable to the vehicle floor 101, and an upper side 27 connected to the flank 6 of the seating 2.

Similarly, the second piston rod 12 and the fourth piston rod 14 form a second articulated quadrilateral 24 externally facing, at least partially, the second flank 7 of the seating 2, wherein such a quadrilateral 24 has a lower side 25 connectable to the vehicle floor 101 and an upper side 28 connected to the flank 7 of the seating 2.

In an advantageous embodiment, the upper hinges 25 15, 16, 17, 18 are arranged above the lower face 45 of the seating.

Furthermore, in a preferred embodiment, the lower face 45 of the seating 2 is at least partially below the base plane B, at least in a seating position 2.

In other terms, the seating 2 can translate, while remaining parallel to itself along a curved trajectory that is defined by the rotation of the upper hinges 15, 16, 17, 18 with respect to the lower hinges 19, 20, 21, 22.

Therefore, the height adjustment of the seating 2 is carried out by means of the rotation of the piston rods 11, 12, 13, 14 with respect to the respective lower hinges 19, 20, 21, 22.

Since the piston rods face externally the flanks 6 and 7 of the seating, the seating can move in the space thereby defined and in the space interposed between the articulated quadrilateral 23 and the quadrilateral 24.

Furthermore, the fact that the upper hinges are arranged above the lower face involves that, the lower face can move closer to the vehicle floor, up to the limit point to contact it, thus eliminating the space between the seating and the vehicle floor and thus allowing to bring the point H to a very reduced distance relative to the vehicle floor, up to a value of about 15 cm.

In an embodiment of the seat, the support 10 is configured so that the lower face 45 of the seating 2 is below the base plane B in any seating 2 position. In this way, for the lower face 45 of the seating 2 to be able to be brought to a minimum distance from the vehicle floor 101, the piston rods 11, 12, 13, 14 have to make a more reduced rotation.

In accordance with an embodiment, the upper hinges 17 and 18 of the third piston rod 13 and of the fourth piston rod 14 are mutually rigidly connected by a transversal transmission bar 29 that is suitable to make the third piston rod 13 and the fourth piston rod 14 integral, and to synchronize the motion thereof.

According to an implementation, the seating 2 comprises a shell 50 so shaped as to form a seating housing 51 having a bottom portion 52 that is defined by the above-mentioned lower face 45 of the seating, and a first side portion 53 and a second side portion 54 forming at least partially the above-mentioned first flank 6 of the seating and said second flank 7 of the same. The seating housing 51 is intended to house a seat cushion 70.

The shell 50 can be of a composite material, comprising particularly reinforcing fibers that are woven or interwoven so as to resist the stresses exerted on the shell by the driver's weight and movements, said fibers being laminated in a matrix that is preferably a resin matrix. For example, the shell 50 can be made of carbon fiber or, for example, of glass fiber in a resin matrix.

The use of such a material involves the advantage of a high lightness of the device, while providing stress resistance.

Such a shell 50 may comprise one or more box-shaped reinforcing structures that are made of the same composite material as the shell 50, particularly arranged along the direction of maximum static and/or dynamic stress, for example along the shell edges and/or along the connection areas to the upper hinges 15, 16, 17, 18.

The above-mentioned box-shaped reinforcing structures can be manufactured by associating a core to the areas to be reinforced, and laminating one or more layers of a composite material on such a core, by partially overlapping it to the already-laminated shell. The cores can be made of any light material, for example, cork or foamed polyurethane.

The use of the composite material involves the advantage to provide a high lightness of the device, while providing stress resistance; furthermore, the presence of box-shaped reinforcing structures allows obtaining some areas having a higher rigidity compared to other ones. In this manner, the shell 50 may have a structural function, supporting and opposing all the stresses. Furthermore, such a shell 50 can be obtained in a single piece, thus reducing the times and costs for its production on one hand, and providing a resistant and self-supporting structure on the other hand.

In an embodiment, the upper hinges 15 and 16 of the first piston rod 11 and of the second piston rod 12 are connected to the shell 50 in a direct manner, without the interposition of further elongation or joining members. Otherwise, the upper hinges 17 and 18 of the third piston rod 13 and of the fourth piston rod 14 are connected to the shell 50 in an indirect manner, by interposing a first elongation plate 41 and a second elongation plate 42.

Such plates, in an embodiment, are arranged externally and at the back with respect to the seating 2, and facing respectively the first side portion 53 and the second side portion 54 of the shell 50, and secured to the shell.

According to such an embodiment, each plate 41 and 42 comprises a respective supporting surface 55 and 56 projecting from the plate 41 and 42 and geometrically couplable to a corresponding complementary surface 58 and 59 formed in the shell 50. Such a projecting portion 55 and 56 extends in an L shape with respect to the plate 41 and 42 which it is connected to, and faces the interior of the seating 2. Furthermore, the above-mentioned complementary portion 58 and 59 of the shell is so shaped as to abut from above against the corresponding above-mentioned projecting portion 55 and 56. Securing means that are selected from pins, screws, rivets, glue, can be provided.

In an embodiment of the seat, the piston rods 11, 12, 13, 14 are constrainable to the vehicle floor 101 by interposing a first connecting rigid elongated member 61 supporting the lower hinges 19 and 21, and a second rigid elongated member 62 supporting the lower hinges 20 and 22.

Such elongated members can be arranged along a direction parallel to the forward direction of the vehicle.

In an embodiment, the connecting rigid elongated members can be slidably constrained along respective sliding guides 63 and 64 that are secured or integral to the vehicle floor 101, said guides 63 and 64 being arranged along directions that are parallel to the forward direction of the vehicle.

In other terms, the position of the seat 1 can be adjusted in the forward direction of the vehicle by making it to slide along the guides 63 and 64, dragging the piston rods 11, 12, 13, 14 and the rigid elongated members 61 and 62 with the seat 1.

Removable locking means of the rigid elongated members 61 and 62 with respect to the guides 63 and 64 can be provided, for example, by means of a rack 201 having a plurality of indentations, which is arranged along the guide 63 and/or 64 and secured to the guide, and an engagement member 202 that is integral to a respective elongated member 61 and/or 62, suitable to elastically and removably engage to said indentations, thus locking the elongated members 61 and 62 with respect to the guides 63 and 64.

In accordance with a possible embodiment, the seat 1 comprises a backrest 3, and each of the above-mentioned first plate 41 and second plate 42 comprises a respective connecting portion 48 and 49 to the backrest 3.

According to an embodiment, the seat 1 comprises a coupling device 73 for a safety belt, which is secured to one of the above-mentioned elongated connecting members 61 or 62. The coupling member 73, since it is integral to the elongated member 61 or 62, follows the movement of the seat 1 when it is made to slide along the guides 63 and 64 for the adjustment in the forward direction of the vehicle.

According to an embodiment, the support (10) for the seating (2) suitable to allow the height adjustment of the seating (2) relative to the vehicle floor (101) can comprise adjustment means 103 that are suitable to move the seating 2 to carry out the above-mentioned adjustment, wherein such adjustment means 103 can be manually actuated or, in combination or alternatively, electrically actuated.

For example, according to an embodiment, such adjustment means 103 are electrically actuated for the height adjustment of the seating 2, and manually actuated for the adjustment of the seating in the other directions.

To the above-described preferred implementation solution of the device, one of ordinary skill in the art, with the aim to meet specific, contingent needs, will be able to make a number of modifications, adaptations, and replacements of elements with other functionally equivalent ones, without for this departing from the scope of the following claims.

The invention claimed is:

1. A seat for a vehicle, having a seating, suitable to allow a driver to sit on said seating in the forward direction of the vehicle, said vehicle having a vehicle floor,
said seating having a first flank and a second flank, on opposite sides with respect to the seating, extending substantially parallel to the forward direction of the vehicle, said seating having a front side facing the forward direction of the vehicle, and an opposite rear side, facing the reverse direction of the vehicle, said seating further having a lower surface or face facing at least one portion of said vehicle floor,
said seat comprising:
a support for said seating that is suitable to allow at least the height adjustment of said seating relative to the vehicle floor, the support comprising a first piston rod and a second piston rod arranged at the front part and externally facing on opposite sides said flanks of said seating, and comprising a third piston rod and a fourth piston rod arranged at the back and facing on opposite sides said flanks of said seating or elongations thereof, each of said piston rods having a respective upper hinge directly or indirectly connected to said flanks of said seating and a respective lower hinge suitable to be constrained directly or indirectly to the vehicle floor, each of said hinges having a respective rotation center, said rotation centers of said lower hinges defining a base plane (B) passing through said centers, said first piston rod and said third piston rod forming a first articulated quadrilateral externally facing, at least partially, said first flank of the seating, and said second and fourth piston rods forming a second articulated quadrilateral externally facing, at least partially, said second flank of said seating wherein said first and second quadrilaterals have a lower side directly or indirectly connectable to the vehicle floor, and an upper side directly or indirectly connected to the seating, wherein:
said upper hinges are above said lower surface or face of said seating; and
said lower surface or face of said seating is at least partially below said base plane (B), at least in a position of adjustment of said seating.

2. The seat according to claim 1, wherein said lower face of said seating is below said base plane (B) in any position of said seating; and/or wherein said upper hinges are mutually connected in at least one length exclusively by said seating, thus avoiding a direct connection thereof.

3. The seat according to claim 1, wherein said upper hinges of said third and fourth piston rods are mutually rigidly connected by a transversal transmission bar that is suitable to synchronize the motion of said third and fourth piston rods.

4. The seat according to claim 1, comprising a first connecting rigid elongated member between the lower hinges of said first and third piston rods and a second connecting rigid elongated member between the lower hinges of said second and fourth piston rods, said first and second connecting rigid elongated members being suitable to be constrainable to the vehicle floor.

5. The seat according to claim 4, comprising a first sliding guide and a second sliding guide that are securable to the vehicle floor and suitable to slidably engage a respective one of said first and second rigid elongated members along a direction parallel to the forward direction of the vehicle, so as to allow an adjustment of the seating position along the forward direction of the vehicle.

6. The seat according to claim 4, comprising a coupling device for a safety belt, said coupling device being secured to one of said first or second connecting rigid elongated members.

7. The seat according to claim 1, wherein said seating comprises a shell that is so shaped as to form a seating housing, said shell having a bottom portion defined by said lower face of said seating and a first and a second side portions forming at least partially said first and said second flanks of said seating.

8. The vehicle seat according to claim 7, wherein said shell has a structural function and is obtained in a single piece.

9. The seat according to claim 7, wherein said shell is so shaped as to house a seat cushion; and/or wherein said seat comprises a backrest, a first elongation plate and second elongation plates comprising a respective portion for the connection to said backrest.

10. The seat according to claim 7, wherein said shell is in composite material.

11. The seat according to claim 10, wherein said shell comprises at least one box-shaped reinforcing structure formed in the same composite material as the shell.

12. The seat according to claim 7, wherein said upper hinges of said first and second piston rods are directly connected to said shell; and/or said upper hinges of said third and fourth piston rods are connected to said shell in an indirect manner, by a first elongation plate and a second elongation plates arranged externally and facing said first and second side portions of said shell and extending at the back with respect to said shell, said first and second plates being integrally secured to said shell by a coupling element.

13. The seat according to claim 12, wherein said coupling element comprise a supporting surface formed in said first and second plates, suitable to be geometrically coupled with a respective complementary surface formed in the shell.

14. The seat according to claim 12, wherein a supporting surface formed in said first and second plates comprises a respective projecting L-shaped portion with respect to said plate and facing the interior of the seating, a complementary surface of said shell being configured to abut from above against said projecting portion of said first and second elongation plates, securing elements selected from pins, screws, rivets, glue being provided between said supporting surface formed in said first and second plates and said complementary surface of the shell.

* * * * *